US011988352B2

(12) United States Patent
Seiffge et al.

(10) Patent No.: US 11,988,352 B2
(45) Date of Patent: May 21, 2024

(54) LIGHT MODULE, MOTOR VEHICLE LIGHT ASSEMBLY, AND PRODUCTION METHOD

(71) Applicant: Marelli Automotive Lighting Reutlingen (Germany) GmbH, Reutlingen (DE)

(72) Inventors: Christian Seiffge, Erfurt (DE); Lothar Pfitzner, Reutlingen (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 0 days.

(21) Appl. No.: 18/163,867

(22) Filed: Feb. 2, 2023

(65) Prior Publication Data

US 2023/0243480 A1 Aug. 3, 2023

(30) Foreign Application Priority Data

Feb. 3, 2022 (DE) ..................... 10 2022 102 582.9

(51) Int. Cl.

*F21S 41/63* (2018.01)
*F21S 41/27* (2018.01)
*F21S 41/657* (2018.01)

(52) U.S. Cl.

CPC ............ *F21S 41/635* (2018.01); *F21S 41/27* (2018.01); *F21S 41/657* (2018.01)

(58) Field of Classification Search

CPC .............................. F21S 41/657; F21S 41/635
See application file for complete search history.

(56) References Cited

U.S. PATENT DOCUMENTS

| | | | |
|---|---|---|---|
| 2015/0062919 | A1 | 3/2015 | Teodecki et al. |
| 2021/0025562 | A1 | 1/2021 | Sato et al. |
| 2022/0221122 | A1 | 7/2022 | Mitterlehner et al. |

(Continued)

FOREIGN PATENT DOCUMENTS

| | | | |
|---|---|---|---|
| CN | 214147739 | U | 9/2021 |
| DE | 202011108359 | U1 | 1/2012 |
| DE | 202014104049 | U1 | 9/2014 |

(Continued)

OTHER PUBLICATIONS

Communication dated Jun. 5, 2023 for European Patent Application No. 23154755.5 transmitting the European Search Report dated May 23, 2023.

(Continued)

*Primary Examiner* — Robert J May
(74) *Attorney, Agent, or Firm* — Howard & Howard Attorneys PLLC

(57) ABSTRACT

A light module for a motor vehicle light is obtained, comprising a light source assembly comprising at least one light source unit, at least one first guide section, and at least one first fasting section, and an optics assembly comprising at least one optical element, at least one second guide section, and at least one second fastening section, wherein the light source assembly and the optics assembly can be moved toward one another along the adjustment axis (J) in a first state, in particular an adjustment state, by the first guide sections, and wherein the light source assembly and the optics assembly can be fixed in place in relation to one another with the first and second fastening sections in a second state, in particular in an adjusted final assembly state.

10 Claims, 3 Drawing Sheets

(56) References Cited

U.S. PATENT DOCUMENTS

2022/0243891 A1 8/2022 Ndiaye et al.

FOREIGN PATENT DOCUMENTS

| | | | |
|---|---|---|---|
| DE | 112019001810 | T5 | 12/2020 |
| DE | 212019000426 | U1 | 6/2021 |
| EP | 2693109 | A2 | 2/2014 |
| EP | 3757450 | A1 | 12/2020 |
| FR | 3098279 | A1 | 1/2021 |

OTHER PUBLICATIONS

Office Action for German Patent Application No. 10 2022 102 582.9 dated Oct. 4, 2022.

LIGHT MODULE, MOTOR VEHICLE LIGHT ASSEMBLY, AND PRODUCTION METHOD

CROSS-REFERENCE TO RELATED APPLICATIONS

The present application claims priority to and all the benefits of German Patent Application No. 10 2022 102 582.9, filed on Feb. 3, 2022, which is expressly incorporated herein by reference.

BACKGROUND OF THE INVENTION

1. Field of the Invention

The invention relates to a light module, a motor vehicle light, and a production process for the light module.

2. Description of the Related Art

It is known that the installation positions of optical components in projection light modules, for motor vehicle headlights in particular, must have small tolerances to ensure that the projected light distribution has no undesired color effects, particularly the edges.

SUMMARY OF THE INVENTION

The problems in the prior art are solved with a light module, a light, and a production process.

A first aspect of the description relates to a light module for a motor vehicle light. This light module comprises a light source assembly comprising at least one light source unit, at least one first guide section and at least one first fastening section, and an optics assembly comprising at least one optical element, at least one second guide section, and at least one second fastening section, in which the light source assembly and the optics assembly can be moved in relation to one another along an adjustment axis by the first and second guide sections in a first state, and in which the light source assembly and the optics assembly are fixed in position in relation to one another by the first and second fastening sections in a second state, in particular in an adjusted final installation state.

This enables an adjustment in which the focal point of the optics assembly or one of the optical components thereof is aligned with the edge of a shutter.

The light module according to the invention makes it possible adjust the edges of the projected light distribution more precisely. The assemblies do not need to be put freely in place, because the guide sections limit movement of the assemblies in relation to one another in an imaginary plane. They are then fixed in the desired position by the fastening sections. There is no need for any additional fasteners. An inflection point in the light distribution of a projected edge light distribution can be more precisely set by the movement of the assemblies along the adjustment axis, enabled by the longitudinal guidance of the two assemblies in relation to one another in the first state.

One advantageous exemplary embodiment is distinguished in that the light source assembly has at least one fastening section for securing the light module in place in the light.

The assembly comprising the light sources is advantageously used for securing the light module. The reference points to the headlamp are therefore located on the assembly on which the light sources are located. This results in a precise light projection by the light module in relation to the vehicle.

One advantageous exemplary embodiment is distinguished in that the optics assembly comprises numerous contact surfaces, which face away from the at least one second guide section.

A clamp can advantageously press the guide sections against one another during the adjustment such that movement in the axial direction is still possible, but the two assemblies can still be secured in an end position in relation to one another via the fastening sections.

One advantageous exemplary embodiment is distinguished in that the at least one second fastening section is located between two imaginary planes that are perpendicular to the adjustment axis, which runs through two spaced apart contact surfaces.

The second fastening section is advantageously located in the optics assembly, specifically in the at least one first guide section, which is pressed against the light source assembly at both sides during the adjustment. Consequently, the final position of the two assemblies can be obtained and set more precisely.

One advantageous exemplary embodiment is distinguished in that the light module has at least two first fastening sections and at least two second fastening sections, in which the pairs of first fastening sections and second fastening sections are spaced apart from one another in an imaginary plane perpendicular to the adjustment axis.

The symmetrical arrangement of the fastening sections results in a more precise final positioning of the assemblies in relation to one another, and tolerances are reduced.

One advantageous exemplary embodiment is distinguished in that the light module has at least two first guide sections and at least two second guide sections, in which the first guide section and second guide section extend in the same longitudinal direction along respective guide axes, and the two guide axes are spaced apart and parallel to the adjustment axis.

The symmetrical arrangement of the guide axes improves the linear movement of the assemblies in relation to one another during the adjustment, and reduces tolerances.

One advantageous exemplary embodiment is distinguished in that the first and second guide sections comprise bearing surfaces that bear against one another and are parallel to the adjustment axis.

The bearing surfaces advantageously allow the assemblies to be moved together in the first state.

One advantageous exemplary embodiment is distinguished in that the at least one second fastening section comprises an expanding section into which a dedicated screw can be screwed and the at least one first fastening section has a slot in which the expanding section engages. This advantageously results in a durable force-fitting connection of the two assemblies.

One advantageous exemplary embodiment is distinguished in that the optics assembly comprises at least one manipulating part, in particular two manipulating parts, in an imaginary plane perpendicular to the adjustment axis, with which the optics assembly can be moved along the adjustment axis.

The two assemblies are moved linearly toward one another in the first state using the at least one manipulating part.

Another aspect of the invention relates to a motor vehicle light that comprises the light module described in the first aspect.

A third aspect of the invention relates to a production process for adjusting the light module described in the first aspect. The production process comprises operating the light source assembly in the first state to generate a first light distribution, which is projected into the optics assembly, wherein a second light distribution is projected from the optics assembly; detecting the second light distribution with a sensor in the first state; moving the optics assembly with the guide section in the first state toward the stationary light source assembly until a position is reached in which a desired second light distribution is obtained; and fixing the optics assembly and light source assembly in place in relation to one another with the fastening section to obtain the second state.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
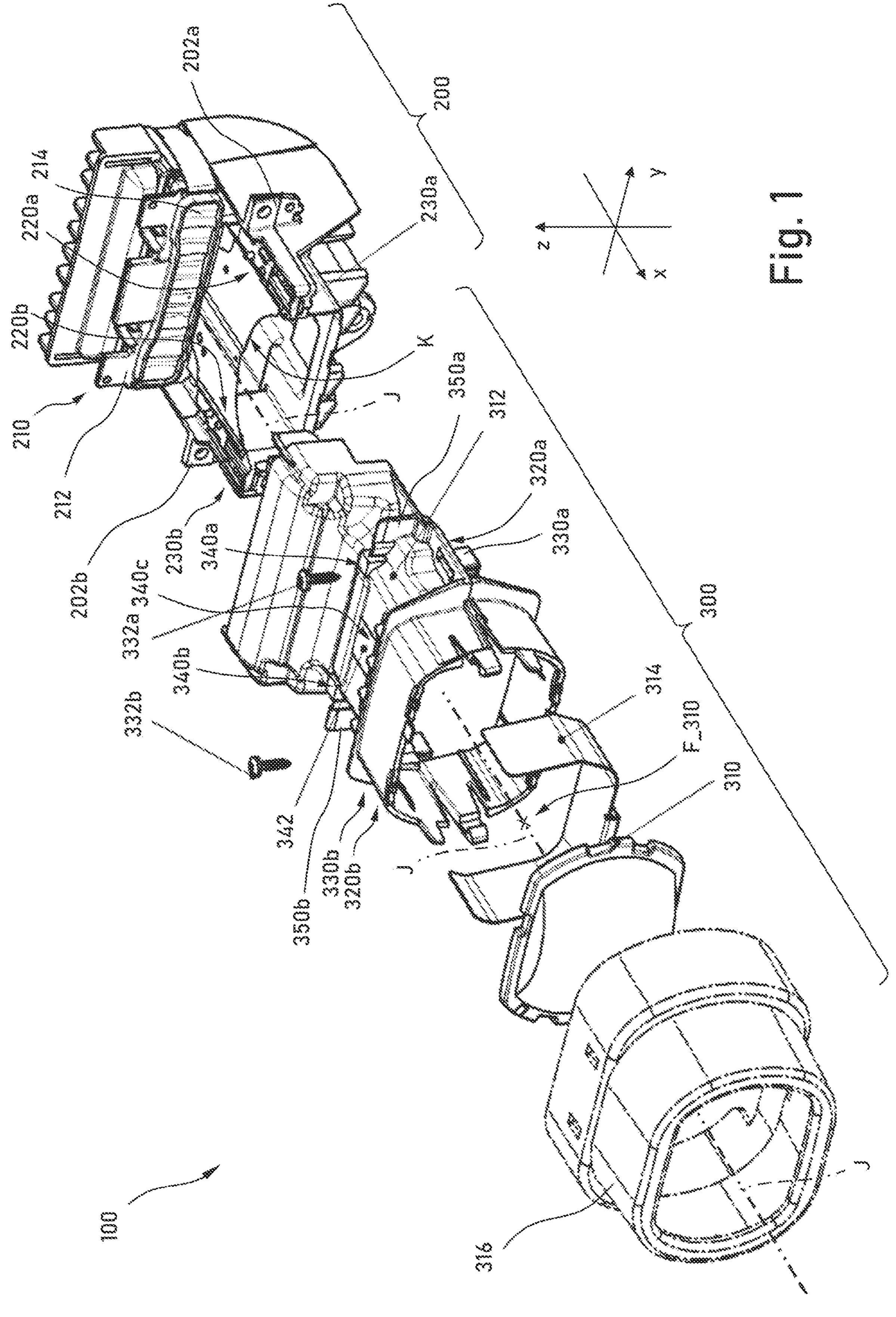
FIG. 1 shows a light module in an exploded view.

FIG. 1 shows an exploded view of a light module 100 for a motor vehicle light in a perspective view. A light source assembly 200 comprises at least one light source unit 210, one transmission optical element 214, one shutter with a shutter edge K, at least one first guide section 220*a-b*, and at least one first fastening section 230*a-b*. The light source assembly 200 is placed on a substrate that forms a heat sink in the present embodiment. An optics assembly 300 comprises at least one optical element 310 with a focal point F-310, at least one second guide section 320*a-b*, and at least one second fastening section 330*a-b*. The light source assembly 200 and the optics assembly 300 can be moved toward one another in a first state, an adjustment state, by the first and second guide sections 220, 320, along an adjustment axis J, which is aligned with the optical axis of the light module 100. In a second state, in particular an adjusted final assembly state, the light source assembly 200 and optics assembly are fixed in place in relation to one another with the first and second fastening sections 230, 330. The optics assembly 300 is moved as a unit in a targeted manner on an imaginary reference plane, which is parallel to the optical axis, and fixed in place with two screws, by way of example.

The light module 100 consequently comprises at least two first fastening sections 230*a-b* and at least two second fastening sections 330*a-b*, in which the pairs of first fastening sections and second fastening sections are spaced apart, at least in the second state, in an imaginary plane perpendicular to the adjustment axis J.

The light module 100 also comprises at least two first guide sections 220*a-b* and at least two second guide sections 320*a-b*, which extend longitudinally in pairs along respective guide axes, at least in the second state, wherein the two guide axes are spaced apart and parallel to the adjustment axis J. The first and second guide sections 220*a-b*, 320*a-b* comprise bearing surfaces 222*a*, 322*a* that bear against one another and are parallel to the adjustment axis J.

The light source unit 210 comprises a printed circuit board 212 populated with light source components, e.g. semiconductor light source components (LEDs). The direction of the light projection is parallel to the adjustment axis J, or angled toward the adjustment axis J. The shutter in the light source unit has a shutter edge K, close to which the transmission optical element 214 generates an intermediate light distribution. The focal point F-310 can be brought onto or near the shutter edge K through the proposed adjustment. The semiconductor light source components emit light that is projected into the transmission optical element 214 secured to the printed circuit board 212. The transmission optical element 214 forms a primary optical element, and generates an intermediate light distribution at the shutter. In one exemplary embodiment, each light source has a dedicated transmission optical element in the form of a catadioptric optical system. Starting at the transmission optical element 214, a light distribution projected therefrom passes the shutter and reaches the optical element 310 in the form of a projection lens. The intermediate light distribution is projected in front of the vehicle after passing the shutter, thus generating the low beam light distribution. The projection lens is held in a lens mount 312, which also contains a heat shield 314. A housing 316 at least partially encloses the lens mount 312. The light source assembly 200 comprises at least two lateral fastening sections 202*a-b* for securing the light module 100 to the light and thus to the body of the motor vehicle.

The optics assembly 300 comprises three contact surfaces 340*a-c* for a clamp in an adjustment device, which are arranged in a triangle. The contact surfaces 340*a-c* face away from the at least one second guide section 320*a-b*, in particular on a side 342 of the optics assembly 300 facing away from the first guide sections 220*a-b*, thus facing away from the part of the assembly to which they are dedicated. The second fastening sections 330*a-b* are placed between two imaginary planes perpendicular to the adjustment axis J, which runs through two contact surfaces 340*a*, 340*c* that are spaced apart from one another.

The lens assembly 300 comprises two manipulating parts 350*a-b* located in a plane perpendicular to the adjustment axis J for moving the optics assembly linearly along the adjustment axis J with a tool designed for this. The manipulating parts 350*a-b* each comprise two bearing surfaces for the tool, facing in opposite directions. The manipulating parts 350*a-b* are located on the sides of the optics assembly 300. The manipulating parts 350*a-b* are set back from an outer contour on the optics assembly 300.

Figure 2:
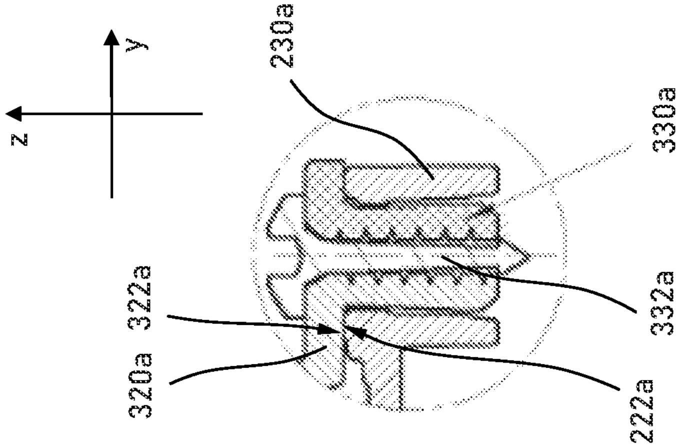
FIGS. 2 and 3 each show detail views of fastening regions for the assemblies in the light module.
Figure 3:
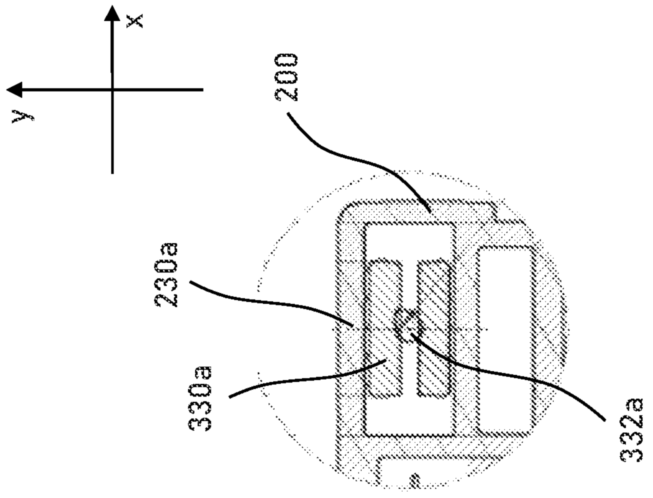

FIGS. 2 and 3 show a detailed cutaway view of the fastening sections 230*a* and 330*a*. This is the light module 100 described above, in which the at least one second fastening section 330*a-b* contains an expansion section, into which a dedicated screw 332*a-b* can be screwed, and in which the at least one first fastening section 230*a-b* contains a slot, in which the expanding section engages. The respective screws 332*a-b* can advantageously be screwed into the expanding sections as soon as the adjustment is completed. The expanding section is then spread apart, and the bearing surfaces on the expanding section press against the inner surfaces of the slot.

Figure 4:
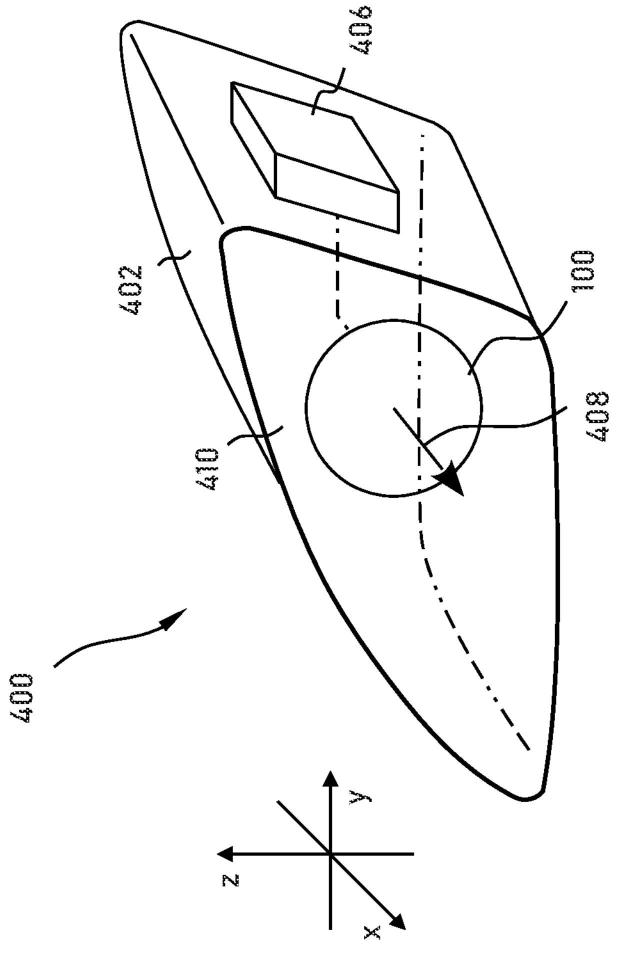
FIG. 4 shows a schematic illustration of a light for a motor vehicle comprising the light module.

FIG. 4 shows the light 400 in the form of a schematically illustrated headlamp for a motor vehicle. This light 400 can also be a taillight, signal light, or some other type of light for a motor vehicle. The light module 100 is located inside the housing 402. The light module 100 is operated with a control unit 406 such that the light module 100 projects a light distribution 408. A light exit hole in the housing 402 is covered with a transparent cover plate 410 through which the light distribution 408 passes.

Figure 5:
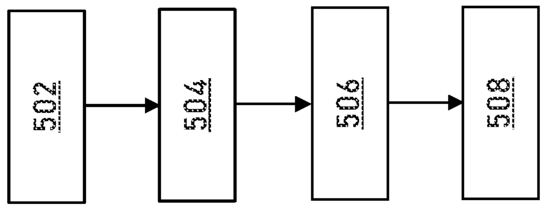
FIG. 5 shows a schematic flow chart for a production process for the light module.

FIG. 5 shows a production process for adjusting the light module 100 shown in FIG. 1 in a schematic flow chart. The light source assembly is operated 502 in the first state in order to generate a first light distribution that is projected into the optics assembly. A second light distribution is then projected from the optics assembly.

The second light distribution is detected in the first state using a sensor 504.

The optics assembly is moved 506 toward the stationary light source assembly in the first state, until a position has been reached in which a desired second light distribution is obtained. This movement takes place with the guide sections using the moving tool while the light sources are on.

In particular, the color fringes on the edge of the light distribution are altered by the movement. As the position of the assemblies in relation to one another changes, the thickness and color of the color fringe is altered. Once a minimal color fringe is reached, or the coloration is as slight as possible, this position is regarded as the final position.

In a subsequent step, the optics assembly 300 and light source assembly 200 are fixed in place in relation to one another using the fastening sections 230*a-b*, 240*a-b* to obtain the second state.

By way of example, prior to operating 502 the light sources, the optics assembly is manually inserted into the light source assembly by a technician. The relative position of the optics assembly is initially irrelevant. The optics assembly is then placed in an initial position, forming a starting position for the steps described above, using the manipulating parts in the form of adjustment fins. The optics assembly is then pressed on the reference plane through spring force via the majority of the contact surfaces, and subsequently moved along adjustment axis, or optical axis, as described in step 506 using the adjustment fins, until the color fringe is correct in a light box containing a sensor, i.e. a predefined quality characteristic is satisfied. This position is then fixed in place in step 508 using two screws. These are screwed into the optics assembly, regardless of where it is located. When the screws are screwed in, an expansion takes place, and a force-fit is obtained in the heat sink, or light source assembly, along the x- and y-axes. This is possible anywhere within the defined adjustment range.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A light module for a motor vehicle light, comprising:

a light source assembly comprising at least one light source unit, at least one first guide section, and at least one first fastening section; and an optics assembly comprising at least one optical element, at least one second guide section, and at least one second fastening section, wherein the light source assembly and the optics assembly can be moved toward one another along an adjustment axis (J) in a first state, by the first and second guide sections, and wherein the light source assembly and the optics assembly can be fixed in place in relation to one another in a second state, in particular an adjusted final assembly state, with the at least one first and second fastening sections, wherein the at least one second fastening section of the optics assembly comprises an expanding section into which a screw can be screwed, and wherein the at least one first fastening section of the light source assembly comprises a slot into which the expanding section fits.

2. The light module as set forth in claim 1, wherein the light source assembly has at least one fastening section for securing the light module on the light.

3. The light module as set forth in claim 1, wherein the optics assembly comprises numerous contact surfaces facing away from the at least one second guide section.

4. The light module as set forth in claim 1, wherein the at least one second fastening section is located between two imaginary planes perpendicular to the adjustment axis (J), which runs between two contact surfaces that are spaced apart from one another.

5. The light module as set forth in claim 1, comprising at least two first fastening sections and at least two second fastening sections, wherein the pairs of first fastening sections and second fastening sections are spaced apart, at least in the second state, in an imaginary plane perpendicular to the adjustment axis (J).

6. The light module as set forth in claim 1, comprising at least two first guide sections and at least second guide sections, wherein the pairs of first guide sections and second guide sections extend longitudinally along a respective guide axis, and wherein the two guide axes are spaced apart and parallel to the adjustment axis (J).

7. The light module as set forth in claim 1, wherein the first and second guide sections comprise bearing surfaces that bear against one another, which are parallel to the adjustment axis (J).

8. The light module as set forth in claim 1, wherein the optics assembly comprises at least one manipulating part, in an imaginary plane perpendicular to the adjustment axis (J), for linear movement of the optics assembly along the adjustment axis (J).

9. A motor vehicle light, in particular a headlamp, comprising the light module as set forth in claim 1.

10. A production process for adjusting the light module as set forth in claim 1, comprising:

operating, in the first state, the light source assembly to generate a first light distribution, which is projected into the optics assembly, wherein a second light distribution is projected from the optics assembly;

detecting, in the first state, the second light distribution using a sensor;

moving, in the first state, the optics assembly toward the stationary light source assembly by the guide sections until reaching a position in which a desired second light distribution is obtained; and fixing the optics assembly and light source assembly in place in relation to one another with the fastening sections to obtain the second state.

* * * * *